United States Patent [19]

Avila

[11] Patent Number: 5,422,011
[45] Date of Patent: Jun. 6, 1995

[54] METHOD FOR RECUPERATING CRUDE OIL FROM SPILLS

[75] Inventor: German V. Avila, Miami, Fla.

[73] Assignee: PECS Holding Corporation Limited, Tortola, Virgin Islands (Br.)

[21] Appl. No.: 139,658

[22] Filed: Oct. 22, 1993

[51] Int. Cl.⁶ ............................................. C02F 1/24
[52] U.S. Cl. ........................... 210/706; 210/738; 210/925
[58] Field of Search ............... 210/738, 749, 925, 703, 210/704, 705, 706

[56] References Cited

U.S. PATENT DOCUMENTS

| | | | |
|---|---|---|---|
| 3,532,622 | 10/1970 | McNeely | 210/925 |
| 4,110,213 | 8/1978 | Tennant et al. | 210/925 |
| 4,492,001 | 1/1985 | Hedrenius | 210/924 |
| 4,764,285 | 8/1988 | Robbins et al. | 210/925 |

FOREIGN PATENT DOCUMENTS 998910 10/1976 Canada .

Primary Examiner—Ivars Cintins
Attorney, Agent, or Firm—J. Sanchelima

[57] ABSTRACT

A method for recuperating crude oil from the body of a spill. First, the body of the spill is sprayed at low pressure then the same operation is done at a relatively higher pressure of at least 100 p.s.i. After the dispersant is allowed to penetrate the body of the spill for several hours, physical agitation of the body of the spill is induced the use of air compressors operating in the range between 500 and 700 psi causing the crude oil to disperse and come to the surface. The crude oil is then extracted from the spill through the use of skimmers and vacuum suction means and subsequently processed.

3 Claims, No Drawings

METHOD FOR RECUPERATING CRUDE OIL FROM SPILLS

BACKGROUND OF THE INVENTION

1. Field of the Invention

The present invention relates to a method for recuperating crude oil from spills, and more particularly, to such a method that also cleans the spills without adversely affecting the ecology of the site.

2. Description of the Related Art

A number of methods to clean crude oil spills have been used in the past with varying degrees of success. However, these methods do not recuperate the spilled crude oil and, in many instances, adversely affect the environment. Most of the methods used today encapsulate the oil together with mixed solids so that the rest of the soil or sediment is not contaminated.

SUMMARY OF THE INVENTION

It is on of the main objects of the present invention to provide a method for cleaning and recuperating the crude oil in a spill without adversely affecting the environment.

It is another object of this present invention to provide a method for cleaning oil spills and recuperating the oil that can be readily applied with the minimum equipment requirement.

It is still another object of this present invention to provide a method for cleaning oil spills that is relatively inexpensive to apply.

Further objects of the invention will be brought out in the following part of the specification, wherein detailed description is for the purpose of fully disclosing the invention without placing limitations thereon.

DETAILED DESCRIPTION OF THE PREFERRED EMBODIMENT

The typical oil spill includes crude oil and suspended solids. The present method is intended to force the crude oil up to the surface and letting the solid bodies settle down. To accomplish this the present invention utilizes the process of inverse emulsion through the utilization of a specific diluted solution of an oil dispersant, the dispersant disclosed in Canadian patent No. 998,910 granted to Dutch Pride Products on Oct. 26, 1976, that includes a number of biodegradable substances, applied under the physical conditions described below. Basically, the active ingredients required of a crude oil dispersant include monoethanoamine, triethanol ammonium laurylsulphate, ethoxylated, propoxylated fatty acid alcohol Plurafac D-25, a product of Wyandotte Chemical Division of BASF Corporation also described in U.S. Pat. No. 3,382,285, coconut fatty betaine, and coconut alkylolamide. The result has been the favorable cleaning of sites that would otherwise have required a considerable longer time to accomplish it and the recuperation of most of the crude oil.

Prior to the utilization of the method, a sample of the oil spill needs to be analyzed to determine its API (American Petroleum Institute) rating.

For the purposes of the present invention, applicant has classified the crude oil in as spill depending on its API rating as type A, B, C, and D. See chart below. If the API rating is low, such as the case of asphalt, the concentration of the active substances in the solution needs to be greater than if a higher API rating is indicated, such as it is the case for paraffin oil. With the present method, it has been possible to recuperate spilled crude oil of the 3rd degree API.

Next, the site is sprayed with the dispersant solution and the amount of the solution sprayed will be determined by the estimated volume of the body of crude oil in the spill. Prior to spraying, the crude oil dispersant or emulsifier is dissolved with salt water. First, the spraying is done at low pressure, and afterwards at high pressure (typically 200 psi) and not less than 100 psi. Then, the solution is allowed to penetrate the spill mass for several hours, depending on the depth of the crude oil body being treated. After the solution has penetrated the deepest layers of the body of crude oil, physical agitation is induced through the use of air compressors working in the range of 500 to 700 psi. This agitation in the body of crude oil being treated will vary depending on the physical configuration that they have. For example, in a shallow sludge pit the time spent agitating the crude oil is less than in a deep pit. The crude oil by this time has been dispersed and its viscosity reduced considerably thereby permitting a user to recuperate it through physical means. Crude oil particles ascend to the surface and solids sink to the bottom. Typically, vacuum trucks and skimmers are utilized to extract the crude oil that now comes to the surface. Finally, the extracted crude oil is stored in reservoirs for its subsequent conventional processing to obtain different types of petroleum products.

The proportion of the crude oil dispersant are as follows:

| Unit | Formula Quantity | Dilution | Type |
|---|---|---|---|
| Paraffinic Based Crude Oil (Per Barrel of 42 Gallons) | | | |
| Gallon | 0,15 ± 20% | 1:10 ± 20% | D |
| Gallon | 0,073 ± 20% | 1:15 ± 20% | C |
| Gallon | 0,055 ± 20% | 1:20 ± 20% | B |
| Gallon | 0,036 ± 20% | 1:30 ± 20% | A |
| (Asphalt Based Crude Oil) | | | |
| Gallon | 0,165 ± 20% | 1:10 ± 20% | D |
| Gallon | 0,083 ± 20% | 1:15 ± 20% | C |
| Gallon | 0,0605 ± 20% | 1:20 ± 20% | B |
| Gallon | 0,0396 ± 20% | 1:30 ± 20% | A | wherein the types of crude oil are defined as follows:
A: light crude oil
B: 18 API to 24 API
C: 12 API to 18 API
D: less than to 12 API It has been found that using salt water (heavier than fresh water) has given the applicant better results. This is attributed to the higher specific weight of salt water which enhances the floating force of the solids.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A method for recuperating crude oil from the body of a spill, having solids mixed with crude oil comprising the steps of:

A. spraying the crude oil spill site with an oil dispersant or emulsifier at low pressure thereafter;

B. spraying the crude oil spill site with an oil dispersant or emulsifier at relatively higher pressures of at least 100 p.s.i.;

C. allowing said sprayed oil dispersant or emulsifier to penetrate the body of the spill so that said dispersant comes in contact with the deepest portions of said oil spill;

D. inducing physical agitation of the body of the spill by injecting air through the use of air compressors operating in the range between 500 and 700 psi causing said crude oil to disperse and come to the surface so that an inverse emulsion with crude oil particles is produced and permitting the separation of said crude oil particles that ascend to the surface and the solids sink to the bottom; and E. extracting said crude oil from the spill through the use of vacuum or skimmer means.

2. The method set forth in claim 1 wherein said crude oil dispersant or emulsifier is a solution that includes the following active ingredients:

monoethanoamine, triethanol ammonium laurylsulphate, ethoxylated, propoxylated fatty acid alcohol, coconut fatty betaine, and coconut alkylolamide.

3. The method set forth in claim 1 wherein said crude oil dispersant or emulsifier is dissolved with salt water prior to spraying it in steps A and B.

* * * * *